Patented May 27, 1947

2,421,118

UNITED STATES PATENT OFFICE 2,421,118

PLANT EXTRACTS AND METHOD OF PRODUCING SAME

Ole Gisvold, Minneapolis, Minn., assignor to Regents of The University of Minnesota, Minneapolis, Minn., a corporation of Minnesota No Drawing. Application October 25, 1945, Serial No. 624,604

6 Claims. (Cl. 260—619)

This invention relates to the preparation of relatively pure extracts of plants of the species Larrea divaricata, suitable for use in pharmaceuticals and foods. Plants of the species Larrea divaricata are sometimes also known as Larrea tridentata or Covellea tridentata, and are commonly known in the United States as "creosote bush." The term Larrea divaricata will be used herein.

This application is a continuation-in-part of my copending application Ser. No. 573,311, filed January 17, 1945.

It has been discovered that plants of the species Larrea divaricata contain nordihydroguaiaretic acid, a compound of phenolic nature, having the empirical formula $C_{18}H_{22}O_4$ and the structure:

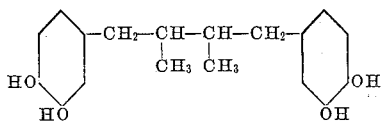

According to the Geneva nomenclature, nordihydroguaiaretic acid may be designated beta, gamma-dimethyl, alpha delta-bis (3,4-dihydroxphenyl) butane. The melting point of this material is 183–184° C.

In addition to nordihydroguaiaretic acid, plant material of the species Larrea divaricata also appears to contain other phenolic constituents, rubber-like substances, pigments, cellulose and various other complexes, which are undesirable contaminants insofar as concerns many uses of the nordihydroguaiaretic acid component, although some of such other constituents are in themselves useful.

It is an object of the invention to provide a convenient, efficient method of separating the constituents of natural plant material of the species Larrea divaricata, and a particular object to provide methods of making extracts having a high concentration of nordihydroguaiaretic acid.

The present invention involves an improvement on previous methods of extraction and purification and results in the isolation of substantially pure nordihydroguaiaretic acid in good yields and with a minimum of processing.

In general the invention comprises the preparation of a crude extract of nordihydroguaiaretic acid from a suitable source material such as the plant Larrea divaricata, which crude extract is then purified to yield crystalline nordihydroguaiaretic acid in accordance with a special procedure outlined in further detail hereinafter.

The crude extract may be prepared by any suitable procedure. I prefer, however, to employ one of the processes outlined in my copending applications Ser. No. 478,321, filed March 6, 1943, and Ser. No. 490,149, filed June 9, 1943, now Patent No. 2,382,475. According to the first mentioned application the crude extract may be prepared as follows:

The plant material consisting of small twigs, leaves, stems, flowering tops, some seed, or the whole plant, if desired, is dried either by air drying or artificial drying. Foreign material such as adherent dirt and the like is removed and the plant material is then preferably, though not necessarily, ground in any suitable mill, such as a hammer mill, a Jacobson mill, or the like, until a fine powder results. Grinding can be accomplished without difficulty, and the powder is fairly dense. The size of grinding is preferably 10 to 100 mesh, 20 to 80 mesh being suitable for most efficient extraction. The powder is yellowish-green in color and has an odor which is not unpleasant when dilute, but is somewhat disagreeable when concentrated. The powdered material may be stored in tightly closed tins for a period of weeks without appreciable deterioration. The whole plant may, if desired, be extracted but for the most efficient and thorough utilization of the raw material it should be ground to a powder.

The plant material is then extracted preferably by percolation or continuous extraction with a solvent capable of extracting the resinous constituent of the plant material. The suitability of any prospective solvent may be gauged by testing an extract solution made with the solvent in question for the color reactions characteristic of catechol using a ferric chloride test solution (known in the pharmacopoeia as ferric chloride T. S.) in the presence of an aqueous solution of sodium carbonate test solution. Thus, to determine the suitability of a prospective solvent, one may make a test extraction and then to the solvent extract add a small quantity of ferric chloride T. S. in accordance with the usual technique for testing for the color reactions characteristic of catechol. Where the desired plant fractions are present, they are revealed even in very dilute strengths. Thus, a small drop of plant extract may be diluted to 15 to 20 cc. with methyl alcohol and this is used for the color tests.

It may be explained that the characteristic green-blue-violet color changes characteristic of catechol may not be very distinct when ferric chloride T. S. alone is used, and so as to bring out the color reactions (and thus make the test more certain) there is added a dilute, preferably freshly prepared, solution of sodium carbonate. This is added drop by drop to the color test solution after ferric chloride T. S. is added. Where the plant extract solvent in question is suitable for the extraction, the much diluted sample of extract solution will be fairly clear and only slightly tinged, a faint olive upon addition of ferric chloride T. S. Upon addition of sodium carbonate, drop by drop, the color changes to an emerald green (a critical color phase, easily passed). As more sodium carbonate is added, the color changes through to a deep blue-green to blue, blue-violet and finally deep violet-red (wine) color. Where the prospective plant extraction solvent is not suitable, these characteristic reactions do not occur.

The solvent may thus be characterized as one capable of yielding an extract of *Larrea divaricata* giving the color reactions characteristic of catechol using ferric chloride T. S. (10% aqueous ferric chloride solution) in the presence of sodium carbonate (1% freshly prepared aqueous sodium carbonate solution).

Exemplary suitable solvents are in general organic solvents containing a halogen, oxygen or nitrogen in the molecular structure or mixtures of these solvents. Thus, oxygen containing organic solvents such as the alkyl ethers, notably ethyl ether, isopropyl ether, butyl ether, and the like, cyclic ethers such as dioxane or a ketone such as acetone, may be used. Other oxygen containing organic solvents are the alcohols, such as methyl, ethyl propyl, amyl, isopropyl and isoamyl alcohols or the glycols, such as propylene glycol; alkyl esters, such as ethyl acetate, or other low boiling acetates; acids such as glacial acetic acid, all are suitable. Likewise the halogen containing organic solvents such as chloroform, dichlormethane, methylene dichloride, ethylene dichloride and ethylene dibromide may be used. Similarly the nitrogen containing organic solvents such as pyridine and "Morpholine," nitromethane, nitro-ethane and nitro-propane may be used. Ethyl ether is preferred where suitable equipment is available.

Some of the foregoing solvents are more efficacious than others and widely different extraction periods are therefore necessary. Thus, when using diethyl ether, the extraction is as complete as necessary for practical purposes in 1½ hours to 4 hours, whereas some of the halogenated solvents, chloroform, ethylene dichloride and the like, require from 8 hours to a day or more for extraction.

The extract is then filtered to remove the extraneous material and the solvent is partially or completely removed by evaporation or distillation. The solvent removal step, the temperatures of distillation or evaporation and other details depend upon the characteristics of the particular solvent used and are obvious once the solvent has been selected as hereinbefore taught. Thus where ethyl ether is used, simple distillation or evaporation is sufficient for its removal. For economy, the solvent should be recovered.

After removal of all or nearly all of the solvent there remains a dark, yellowish-brown, tarry mass which is designated herein as the "crude" or "primary" extract. This extract contains substantial amounts of nordihydroguaiaretic acid (probably 25–35%), and some fats, waxes, rubber-like materials, pigments, some of which are flavone-like materials, and other fractions. It may be pointed out at this juncture that there is no accurate method available for the quantitative determination of nordihydroguaiaretic acid, and the content is therefore judged from the amount of crystalline nordihydroguaiaretic acid recovered, as hereinafter described from a given quantity of the primary extract.

According to the latter application, now Patent No. 2,382,475, referred to above the crude extract may be prepared as follows:

There may be utilized the whole plant, including the entire woody portions, leaves, stems, flowers and buds. The plant material may be used either in the dried or green states, the latter being preferred. The plant material is preferably not ground, although chopped or packed plant material may be used for convenience in handling.

The plant material is extracted with an aqueous solution of alkali hydroxide such as sodium hydroxide, potassium hydroxide or with ammonium hydroxide. Sodium and potassium hydroxides are preferred because of their excellent extractive ability, low cost and availability. The aqueous hydroxide solution may be used either weak or strong, preferably a concentration of from 2 to 10%, and to the aqueous solution there is added a reducing agent, preferably sodium hydrosulfite, the percentage of the latter being about half of the percentage of the hydroxide, viz., 1–5%, although this is not critical. The reducing agent serves to protect the ortho hydroquinone nuclei of the nordihydroguaiaretic acid from oxidation during the alkali extraction. Sodium hydrosulfite serves admirably for this purpose but other reducing agents of equivalent strength, capable of reducing orthoquinones to the corresponding ortho hydroquinones under alkaline conditions, may be used. The extraction is made at room temperature, viz., 15–25° C. although slightly elevated temperatures are not harmful.

Extraction is carried out by leaching or percolation, and is usually complete in from 15 minutes to 1 hour. If desired, the extraction may be carried out by a counter-current procedure in a number of vessels, the aqueous hydroxide-reducing agent solution being removed from the first vessel and conveyed onto the plant material of the second vessel after a few minutes extraction in the first vessel. Thereafter, a fresh sodium hydroxide-reducing agent solution is conveyed to the first vessel and after a suitable interval the leaching solution of the second vessel is removed and conveyed into a third vessel containing fresh plant material while the aqueous hydroxide-reducing agent solution is likewise conveyed from the first vessel to the second vessel. This may be repeated through any number of vessels, the aqueous hydroxide-reducing agent solution being permitted to remain in each vessel for a short time, after which it is removed and conveyed to the next succeeding vessel in the series. After from 2 to 4 leachings of the plant material in the first vessel, the extraction of the plant material therein is complete and it is removed and discarded whereupon fresh plant material is placed in this vessel and it becomes the last in the series. By this counterflow procedure, efficient use may be made of the aqueous hydroxide-reducing agent solution.

The leaching liquid containing the extracted material is then acidulated with any suitable inorganic or organic acid, hydrochloric, sulfuric and glacial acetic acids being exemplary. It is desired that the acidulation be carried to the point at which a flocculation appears in the extraction solution, at which point the solution is just neutral or a trifle basic when tested with litmus. In the event too much acid is added, a considerable precipitation will occur but there still remains an appreciable dispersion of colloidal particles. However, no harm is done by over acidulation, and should such be encountered, it is only necessary to add a dilute alkali solution to decrease the acidity slowly until the flocculation again appears. At the flocculation stage, there still remains in the extraction liquor a considerable amount of suspended matter which imparts to the liquor a somewhat cloudy appearance. However, the flocculent precipitate represents a good portion of the desired constituents and this settles out after standing for 12 hours or more. Due to consideration of cost of raw material, it is usually unnecessary to recover the suspended matter in the extraction liquor but this may be recovered and used if desired.

The aqueous extraction solution, neutralized as indicated, may also be treated by centrifuging in order to facilitate separation of the flocculent precipitate. Also, under some conditions, a fairly tough curd develops and agglomerates. Where settling is used, a longer period of settling, as for example a week or more, causes the flocculent precipitate to settle in a fairly solid mass and this is desirable since it is useful to remove as large an amount of water as is possible at this stage.

Crude extracts thus prepared or prepared by other procedures which result in crude extracts of the same type are the starting material for the present invention. A peculiar phenomenon appears to be involved in the process of this invention. When it is attempted to crystallize nordihydroguaiaretic acid from a solution of it and ordinarily occurring impurities in an ordinary solvent such as alcohol or ether, no crystallization occurs but rather the whole mass appears to solidify to an amorphous somewhat plastic body and no separation of nordihydroguaiaretic acid occurs. When, however, the nordihydroguaiaretic acid is crystallized from a nitroparaffin, no such difficulty is encountered and the crystals can be isolated readily and in relative purity.

Apparently the manner of processing and the nature of the solvent affect the balance of the physical system such that a crystalline precipitate is obtained. Whatever the explanation of the phenomenon, the fact of its occurrence is established and a simple and economical method of isolating nordihydroguaiaretic acid is provided, and constitutes a tremendous advance over the processes heretofore available for the isolation of this material.

The process of the present invention is carried out as follows: A crude extract of nordihydroguaiaretic acid and impurities as heretofore described is treated, either as such or in a solution in any suitable solvent as heretofore mentioned, with a nitroparaffin to prepare a solution of the extract in the nitroparaffin. The nitroparaffin solution is then concentrated and the nordihydroguaiaretic acid crystallized therefrom.

When the crude extract is preliminarily taken up in an ordinary solvent, I prefer to use methyl or ethyl alcohol, although other solvents for the primary extracts can be employed with lesser satisfaction.

The solution thus obtained is then mixed with a suitable quantity of a nitroparaffin, and the supernatant liquid separated from the insoluble matter. The preliminary solvent is then removed; in the case of water miscible alcohols, this may be accomplished by water washing. The nitroparaffin solution is then concentrated by evaporation and allowed to crystallize. The crystallized nordihydroguaiaretic acid may then be washed with a small quantity of nitroparaffin, ethylene dichloride and the like, to remove impurities from the surface of the crystals.

When the crude extract is taken up directly in a nitroparaffin the step of eliminating the preliminary solvent is obviated. The crude extract is simply mixed with suitable quantities of nitroparaffin in accordance with established extraction technique and then separated from insoluble material. The solution is then concentrated and crystallized. The crystals are then separated and washed free of impurities.

The following examples will serve to illustrate the invention:

Example I

A primary extract from 200 grams of drug made with sodium hydroxide and sodium hydrosulfite as described in my preceding application Ser. No. 490,149, now Patent No. 2,382,475, was mixed with 25 to 35 cc. of methyl alcohol or ethyl alcohol. If the primary extract has not been thoroughly acidulated in its preparation, 1 cc. of 50% strength (commercial) hypophosphorus acid can be added to this mixture. Hypophosphorus acid is a powerful reducing agent capable of accomplishing this function under acidic conditions. It serves to prevent oxidation of the nordihydroguaiaretic acid during the purification. Heat may or may not be applied to this mixture. The cool (25° C.) mixture was then diluted slowly with continuous stirring with 200 cc. of nitromethane. The supernatant liquid was then separated from the insoluble matter present and placed in a separatory funnel. 100 to 150 cc. of water were then added and the mixture carefully agitated. After separation into two layers, the lower aqueous-alcoholic layer was removed and the nitro-methane layer washed once or twice with 25 cc. portions of water. The nitro-methane layer was concentrated by heating under vacuum until practically all the solvent had been removed, at which point the residue was a solid crystalline mass of orange color. This was mixed up with warm ethylene dichloride and the ethylene dichloride filtered off and then washed again with warm ethylene dichloride while on the filter. The dry nordihydroguaiaretic acid was very light buff color. Yield 3.75%.

Example II

A primary extract from 200 grams of drug, made with sodium hydroxide and sodium hydrosulfite in my preceding application Serial No. 490,149, now Patent No. 2,382,475, was covered with 150 cc. of 1-nitropropane. This mixture was heated to about 60° C. and stirred vigorously for about 10 minutes. If the primary extract has not been thoroughly acidulated in its preparation, 1 to 3 cc. of 50% strength commercial hypophosphorus acid can be added to this mixture for its protecting effect upon nordihydroguaiaretic acid. The supernatant liquid was decanted and the residue treated with a second 150 cc. portion of 1-nitropropane as described above. The two portions of solvent were combined, filtered and concentrated under a vacuum until the solvent was almost completely removed. A semi-solid crystalline mass was obtained. This semi-solid crystalline mass can be allowed to stand several hours to insure more complete crystallization of the nordihydroguaiaretic acid. This crystalline mass can then be mixed with warm (60° C.) or cold (25° C.) 1-nitropropane and the mixture filtered to collect the crystalline nordihydroguaiaretic acid which can be washed with several portions of warm or cold 1-nitropropane.

In some instances, particularly on a small scale, difficulty is encountered in getting optimum crystal growth. It has been found that this difficulty can be overcome by the addition of a small quantity of hot ethylene dichloride. The mixture is then allowed to stand several hours after which a further quantity of warm ethylene dichloride may be added and the mixture filtered. The crystals of nordihydroguaiaretic acid may then be washed with warm ethylene dichloride to yield nordihydroguaiaretic acid of pale yellow color when dried.

When 1-nitropropane and nitromethane have been specifically described in the examples as suitable solvents for the nordihydroguaiaretic acid, other nitroparaffins such as 2-nitropropane are also suitable. It is believed that nitroparaffins in general are suitable for this purpose, particularly the lower paraffins. In view of the commercial availability of the nitroparaffins mentioned herein, however, they are preferred.

It will be apparent that further crops of crystals of lesser degree of purity can be obtained from the mother liquor of the first crystallization and from the washing solvent. These vary from ecru to pale yellow in color and may be employed where the extreme purity of the primary crystals is not required.

It will be apparent that numerous variations may be made within the scope of the invention without departing from the spirit thereof. For example, time periods, temperatures, amounts of solvents and the like, may be varied from those specifically set forth in the specific examples. It is to be understood therefore that the invention is to be limited only by the appended claims.

What I claim is:

1. Process of separating nordihydroguaiaretic acid from a crude extract containing nordihydroguaiaretic acid and impurities which comprises preparing a solution of the nordihydroguaiaretic acid in a lower nitroparaffin, crystallizing the nordihydroguaiaretic acid from the nitroparaffin and separating the crystals from the nitroparaffin.

2. Process of separating nordihydroguaiaretic acid from a crude extract containing nordihydroguaiaretic acid and impurities dissolved in a solvent therefor, which comprises adding a lower nitroparaffin to said extract, removing said solvent and part or the nitroparaffin, crystallizing the nordihydroguaiaretic acid from the remaining nitroparaffin and separating the crystals from the nitroparaffin.

3. Process of separating nordihydroguaiaretic acid from a crude extract containing nordihydroguaiaretic acid and impurities dissolved in a low aliphatic alcohol which comprises adding a lower nitroparaffin to the extract, washing the resulting solution with water to remove the alcohol, evaporating part of the nitroparaffin to concentrate the nordihydroguaiaretic acid in the remaining nitroparaffin, crystallizing the nordihydroguaiaretic acid, separating the crystals from the mother liquor and washing impurities from the surface of the crystals.

4. Process of separating nordihydroguaiaretic acid from a crude extract containing nordihydroguaiaretic acid and impurities which comprises dissolving the extract in a lower nitroparaffin, separating insoluble matter, concentrating the resultant solution by evaporation of the nitroparaffin and crystallizing the nordihydroguaiaretic acid and separating the crystals from the mother liquor.

5. Process according to claim 2 in which the nitroparaffin is a 1-nitropropane.

6. Process of separating nordihydroguaiaretic acid from a crude extract containing nordihydroguaiaretic acid and impurities dissolved in a solvent therefor, which comprises adding nitromethane to said extract, removing said solvent and part of the nitro-methane, crystallizing said nordihydroguaiaretic acid from the remaining nitro-methane and washing said crystallized nordihydroguaiaretic acid with nitro-methane to separate impurities therefrom.

OLE GISVOLD.